Patented Feb. 18, 1930

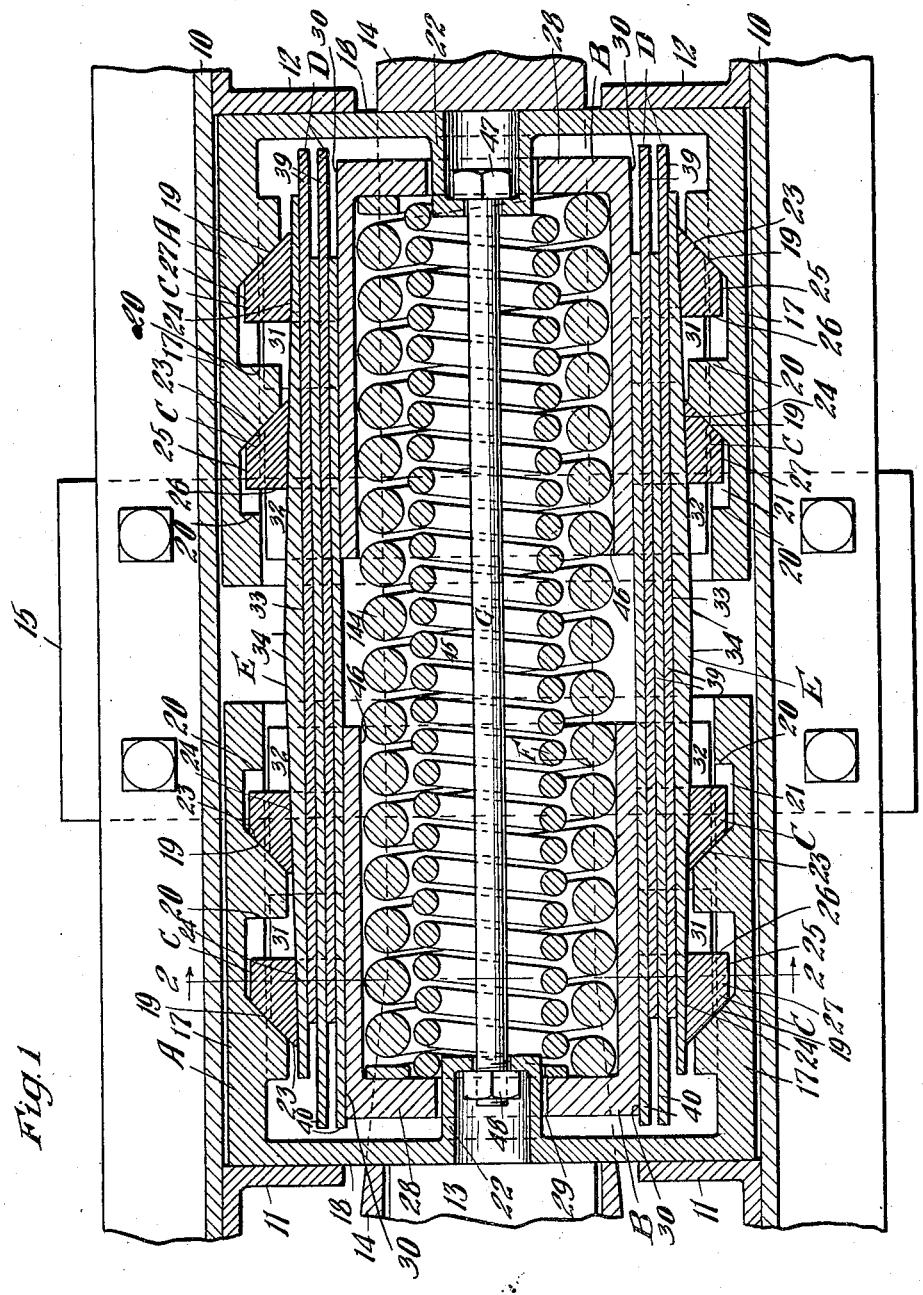

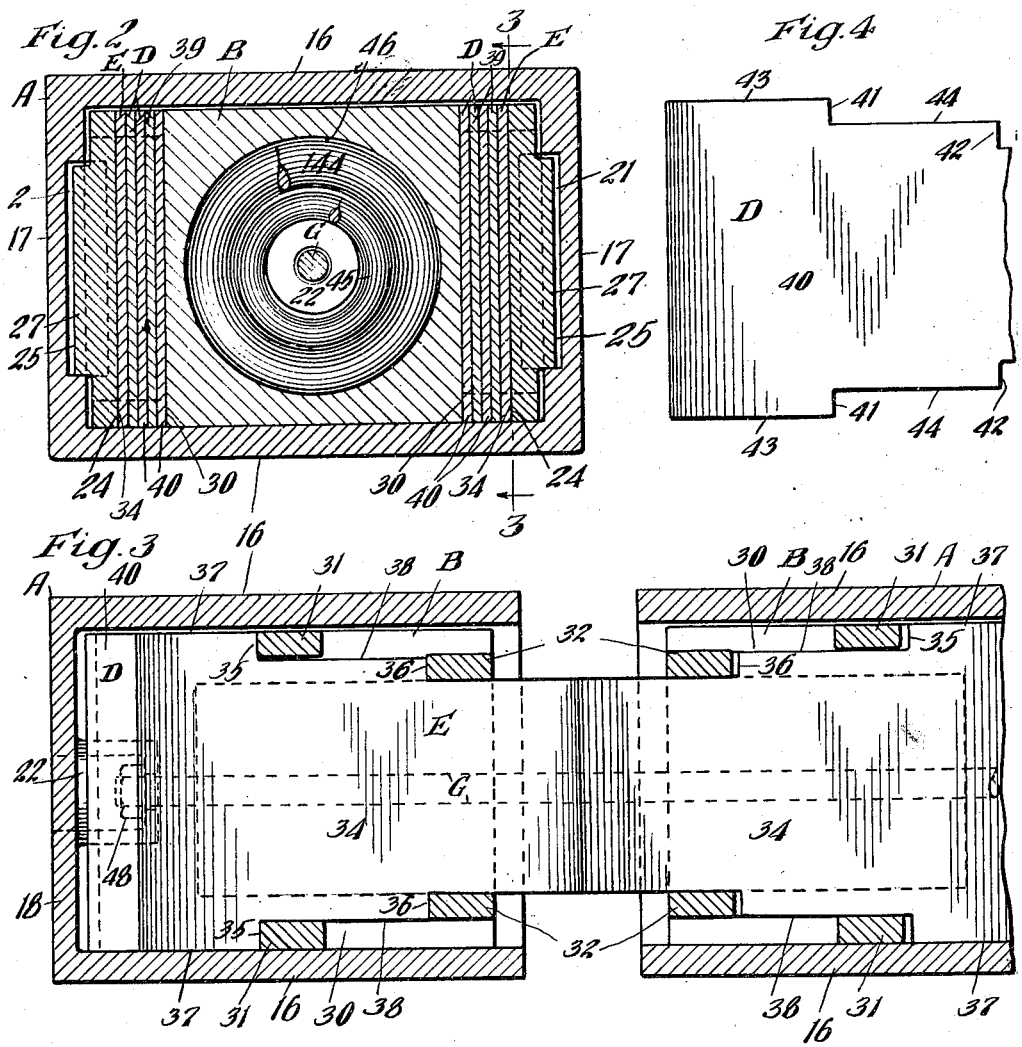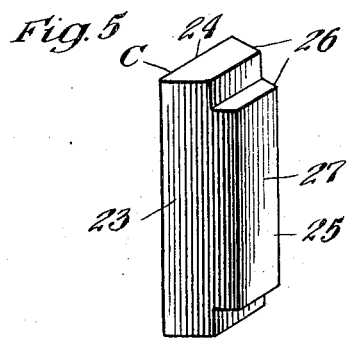

1,747,481

UNITED STATES PATENT OFFICE

JOHN F. O'CONNOR, OF CHICAGO, ILLINOIS, ASSIGNOR, BY MESNE ASSIGNMENTS, TO W. H. MINER, INC., A CORPORATION OF DELAWARE

FRICTION SHOCK-ABSORBING MECHANISM

Application filed February 8, 1923. Serial No. 617,692.

This invention relates to improvements in friction shock absorbing mechanisms.

One object of the invention is to provide a friction shock absorbing mechanism, adapted for use in connection with railway draft riggings, wherein is obtained high capacity due to large frictional areas, and wherein a differential wedge action is made use of to assure quick and positive release of a plurality of friction plates.

Another object of the invention is to provide a friction shock absorbing mechanism of the type referred to, including a plurality of relatively movable intercalated friction plates, wherein a preliminary action of the followers and the wedges takes place, prior to the engagement of the plates by the followers, whereby easy release of the parts is obtained when the actuating pressure is removed.

Other objects of the invention will more clearly appear from the description and claims hereinafter following.

In the drawings forming a part of this specification, Fig. 1 is a horizontal longitudinal sectional view of a portion of a railway draft rigging showing my improved shock absorbing mechanism in connection therewith. Fig. 2 is a vertical transverse sectional view corresponding substantially to the line 2—2 of Fig. 1. Fig. 3 is a vertical longitudinal sectional view corresponding substantially to the line 3—3 of Fig. 2. Fig. 4 is a side elevational view of one end of a movable friction plate used in connection with the shock absorbing mechanism. And Fig. 5 is a detailed perspective view of one of the wedge blocks.

In said drawings, 10—10 indicate channel shaped center or draft sills to the inner faces of which are secured front stop lugs 11 and rear stop lugs 12. A portion of the draw-bar is shown at 13, to which is attached the yoke 14. The shock absorbing mechanism proper, including the front and rear follower casings, is disposed within the yoke 14 and the movable parts of the draft riggings are supported by the detachable saddle plate 15.

The improved shock absorbing mechanism proper as shown, comprises, broadly, front and rear follower casings A—A; combined spring follower and friction shells B—B; wedge blocks C—C; friction plates D—D; tapering friction elements E—E; spring resistance F; and retainer bolt G.

The follower casings A are of similar construction, and each comprises horizontally extending spaced upper and lower walls 16 and vertically extending spaced side walls 17, connected by a vertically extending end wall 18. The opposite side walls 17 of each casing are provided with a pair of wedge faces 19 and a pair of spaced shoulders 20. As clearly shown in Figs. 1 and 2 the wedge faces 19 are shorter at the upper and lower ends than at the central portion thereof, thereby forming recesses 21, each adapted to receive a central projection on the main portion of the wedge blocks C. The rear walls 18 of the front and rear follower casings A co-act respectively with the front stop lugs 11 and the rear stop lugs 12. Each of the follower casings A is also provided with an inwardly extending hollow boss 22 for a purpose hereinafter described.

The wedges C are eight in number, four being associated with each follower casing A, the same being arranged in pairs. Each pair of wedges C co-operates with the wedge faces 19 on one of the opposite side walls 17 of the casing A. The wedge blocks C are each provided with a wedge face 23 adapted to co-act with one of the wedge faces 19 of the casing A, an inner flat side face 24 adapted to co-act with the outer side of one of the tapering friction elements E, an outer flat side face 25 and a rear flat face 26. As clearly shown in Fig. 5, each of the wedge blocks C is cut away at the upper and lower ends thereof to provide an inwardly projecting portion 27 adapted to extend into a recess 21.

The combined spring followers and friction shells B are of rectangular form, each being provided with a cylindrical bore 46 adapted to receive the spring resistance. The end wall 28 of each casing is provided with an axial opening 29 adapted to loosely receive the corresponding centering boss 22 inwardly projecting from the end wall 18 of the casing A. The opposite side walls of the shells B are provided with exterior flat friction surfaces 30 adapted to co-act with the friction plates D. Each of the shells is also provided with two pairs of upper and lower lugs 31—31 and two pairs of upper and lower lugs 32—32, projecting laterally from the opposite side walls thereof. As clearly shown in Fig. 3, the lugs 32 of each shell are located at the inner end thereof, and are spaced apart vertically a shorter distance than the lugs 31, for a purpose hereinafter described. The outer faces of the lugs 31 and 32 are adapted to engage with the rear faces 26 of the wedges C, whereby rearward movement of the wedges C is communicated through the lugs 31 and 32 to the shells B, and the wedges C are permitted to move laterally with respect to the shells B. Upon outward movement of the shells B the lugs are adapted to restore the wedges C to normal position.

The tapered friction elements E are two in number and are arranged at opposite sides of the gear. Each of the tapering friction elements E is provided with an inner flat friction face 33 and a pair of friction wedge faces 34 on the outer side thereof. The flat friction faces 34 are slightly inclined with reference to the longitudinal axis of the gear and extend at an angle to each other. As clearly shown in Fig. 1, each of the flat friction faces 34 of the tapering friction elements E is adapted to co-act with the flat friction faces 24 of a pair of wedges associated with one of the side walls 17 of the casings A.

Each of the tapering friction elements E is provided at opposite ends, as clearly shown in Fig. 3, with upwardly and downwardly projecting stepped lugs thereby providing an outer pair of shoulders 35 and an inner pair of shoulders 36 and upper and lower flat faces 37 and upper and lower flat faces 38. The shoulders 35 are in vertical alinement and are adapted to engage with the outer faces of the lugs 31. The shoulders 36 are also in vertical alinement and are adapted to engage with the outer faces of the lugs 32. It will be evident that the lugs 31 and 32, by engagement with the shoulders 35 and 36, will act to restore the tapering friction elements E to normal position when pressure on the mechanism is removed and the friction shells B are returned to their normal position.

The friction plates D are arranged within the casings A and comprise two opposite groups. As herein shown, the groups of plates D each comprise two plates 39 and two plates 40, the plates 39 and 40 being alternated, with a plate 39 of each group outermost and in contact with the flat friction face 33 of the adjacent tapered friction element E. The inner plate 40 of each group of plates is in contact with the side friction surfaces 30 of the front and rear friction shells B. The plates 39 and 40 are of similar construction, and as best shown in Fig. 4, each of the plates 40 is enlarged at one end and formed with upper and lower outer shoulders 41 and upper and lower inner shoulders 42, flat upper and lower faces 43 extending from the end of the plates to the shoulders 41 and flat upper and lower faces 44 extending from the shoulders 41 to the shoulders 42. By this arrangement two pairs of shoulders are provided which are arranged in different planes, the upper shoulder 41 of the outer pair being in a plane above the upper shoulder 42 of the inner pair and the lower shoulder 41 of the outer pair being in a lower plane than the lower shoulder 42 of the inner pair. The shoulders 41 and 42 are adapted to engage respectively with the outer faces of the lugs 31 and 32 whereby, upon outward movement of the friction shells, the plates B are adapted to be restored to normal position. As shown in Fig. 1, the plates 39 are all so arranged that the shoulders 41 and 42 thereof are adapted to be engaged by the lugs of the outer friction shell B, and the plates 40 are arranged so that the shoulders 41 and 42 thereon are adapted to be engaged by the lugs on the rear friction shell B, with the free ends of the plates 39 normally spaced from the inner face of the end wall 18 of the rear follower casing A, and the free ends of the plates 40 spaced from the inner face of the end wall 18 of the front follower casing A.

The spring resistance F comprises an outer relatively heavy coiled spring 144 and an inner relatively lighter coiled spring 45. The springs 144 and 45 are received within the bores 46 of the friction shells and abut the inner faces of the rear walls thereof.

The retainer bolt G passes axially through the inner spring 45 and has one end thereof anchored to the hollow boss 22 of the rear follower casing A by means of the head 47 and has the opposite end thereof anchored to the hollow boss 22 of the front follower casing A by means of the nut 48. The retainer bolt serves to hold the parts of the draft gear under initial compression whereby wear of the parts is compensated for. In this connection it is pointed out that the shoulders 35 and 36 at the opposite ends of the tapering friction elements E are so arranged with reference to the lugs 31 and 32 on the respective friction shells B, as to provide a slight spacing between the lugs of one of the shells and the shoulders of the corresponding end of each tapered friction element, to allow for wear of the parts.

In the operation of my improved shock absorbing mechanism, assuming that the front follower A is being moved rearwardly toward the rear follower during buff, a wedge action is set up between the wedge faces 19 on the front follower and the co-acting wedges C, and the wedges C are moved rearwardly with the follower. As the wedges C associated with the front follower are engaged with the lugs of the front friction shell B, the shell will be carried along with the wedges compressing the spring resistance F and applying a rearwardly directed pressure on the rear friction shell B, to move same rearwardly also. The rearward movement of the rear shell B will be communicated to the wedges C associated with the rear follower casing A by means of the lugs 31 and 32, thereby setting up a wedging action between the wedges C associated with the rear follower casing and the wedge faces 19 on said casing. During the described action of the mechanism, the tapering friction elements E and the groups of friction plates D will be placed under lateral pressure by the wedges C. There will also be a tendency to move the tapering friction elements E and the groups of friction plates D rearwardly due to the friction created between the wedges C and the tapering friction elements E and between the friction plates D and the front friction shell B. But, there will be an equal opposition to this rearward movement due to the friction created between the wedges C associated with the rear follower casing, the tapering wedge elements E, the friction plates D and the rear friction shell B, and therefore the tapering friction elements E and the friction plates D will move rearwardly approximately one-half of the distance through which the front follower moves. As the front follower casing is moved rearwardly toward the rear follower casing, there will also be effected a relative sliding movement between the wedges associated with the front and rear follower casings and the tapering friction elements E, thereby effecting a differential wedging action, causing the wedges C to move on the wedge faces 19 of the follower casings in a direction laterally away from the axis and longitudinally toward the transverse center of the gear, thereby creating additional pressure on the friction plates D and effecting a further compression of the spring resistance F, due to the rearward movement of the front friction shell B and the wedges C. Upon further inward movement of the front follower, the inner face of the end wall 18 thereof will be brought into engagement with the free, adjacent ends of the plates 40, and the free ends of the plates 39 will simultaneously be brought into engagement with the inner face of the end wall 18 of the rear follower casing A, whereupon the plates 39 and 40 will be moved relatively to each other, thereby creating additional frictional resistance in opposition to the rearward movement of the front follower casing. As the front and rear friction shells B approach each other and the friction plates 39 and 40 are moved relatively to each other, the lugs on the shells will be moved out of contact and away from the shoulders on the friction plates and tapering wedge elements E.

It will be evident, that upon movement of the front follower, the friction plates will not only slide relatively to each other, but there will also be a relative sliding movement between the inner plates 40 and the shells B and between the outer plates 39 and the tapering friction elements E, thereby opposing additional frictional resistance to the inward movement of the front follower casing.

During the draft action of the shock absorbing mechanism, the operation is similar to that just described, the only difference being that the rear follower A is moved toward the front follower A.

Upon removal of the actuating pressure on the shock absorbing mechanism, the wedges C will be caused to move outwardly first, due to the expansive force of the spring resistance F, acting through the friction shells B with the lugs engaging rear faces of the wedges C, thus causing the prompt release of the wedging mechanism and an immediate decrease of pressure on the friction plates.

As the lugs on the friction shells are spaced from the shoulders of the friction plates and tapering friction elements E, during the compression of the gear, there will be no movement of the plates D and the tapering elements E, during release, until after the wedges C have been fully released and moved outwardly by the lugs 31 and 32, a short distance relatively to the tapering elements and friction plates, and the pressure reduced on the plates D, whereupon the plates will be picked up by the lugs and returned to their original position.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with front and rear followers, provided with wedge faces; of wedges co-acting with said wedge faces; a pair of spring follower shells provided with longitudinally arranged flat external friction surfaces; a spring resistance; longitudinally arranged intercalated friction plates, said plates being divided into two groups on opposite sides of said spring follower shells, with the innermost plate of each group co-acting with the adjacent friction surfaces of said spring follower shells; and tapering friction elements interposed between the groups of plates and the wedges.

2. In a friction shock absorbing mechanism, the combination with front and rear followers having wedge means associated therewith; of a pair of relatively movable friction shells, said shells being movable with respect to the respective followers; a spring resistance interposed between said friction shells; and longitudinally arranged intercalated friction plates, said plates being divided into two groups on opposite sides of said shells, with the innermost plate of each group in contact with the friction shells, and the outermost plates of the groups of plates co-acting with the wedging means.

3. In a friction shock absorbing mechanism, the combination with front and rear followers having wedging means associated therewith; of a pair of floating friction members disposed between said followers, each provided with longitudinally extending friction surfaces on the opposite sides thereof; a spring resistance co-acting with said friction members; and longitudinally arranged friction plates, said plates being divided into two groups, on opposite sides of said friction members and co-acting with said wedging means.

4. In a friction shock absorbing mechanism, the combination with front and rear follower casings provided with oppositely arranged interior wedge surfaces on the side walls thereof; of a plurality of wedges co-acting with said wedge surfaces; front and rear friction elements movable lengthwise with respect to said followers, each provided with longitudinally extending friction surfaces on the opposite sides thereof; a spring resistance co-acting with said friction elements; longitudinally arranged friction plates, said plates being divided into two groups on opposite sides of said friction elements, and interposed between the friction surfaces of said elements and the wedges whereby, upon relative movement of said follower casings, the friction elements and friction plates are subjected to a wedging pressure.

5. In a friction shock absorbing mechanism, the combination with front and rear follower casings provided with oppositely arranged interior wedge surfaces on the side walls thereof; of a plurality of wedges co-acting with said wedge surfaces; front and rear friction elements each provided with longitudinally extending friction surfaces on opposite sides thereof; a spring resistance co-acting with said friction elements; longitudinally arranged friction plates, said plates being divided into two groups on opposite sides of said friction elements, with the innermost plate of each group co-acting with the adjacent friction faces thereof; and a tapering friction member interposed between each group of friction plates and the walls of the follower casings, and in engagement with the wedges co-acting with the wedge faces on said last named walls.

6. In a friction shock absorbing mechanism, the combination with front and rear followers having wedge means associated therewith; of a pair of relatively movable friction shells; a spring resistance interposed between said friction shells; longitudinally arranged tapering friction elements co-acting with said wedge means; longitudinally arranged relatively movable intercalated friction plates arranged in sets, adapted to be actuated by said followers, said sets of plates being divided into two groups on opposite sides of said shells, with the innermost plate of each group in contact with the friction shells, and the outer plate of each group co-acting with one of said tapering elements, corresponding ends of one set of plates being normally slightly spaced from the inner face of one of said followers and the opposite ends of the other set of plates being normally slightly spaced from the other follower, whereby, upon relative movement of said followers, the wedges are actuated thereby, prior to engagement of the followers with the friction plates.

7. In a friction shock absorbing mechanism, the combination with front and rear followers having wedging means associated therewith; of a pair of relatively movable friction shells; a spring resistance interposed between said friction shells; longitudinally arranged sets of intercalated friction plates, said sets of plates being divided into two groups on opposite sides of said shells, with the innermost plate of each group in contact with said shells and the outermost plates of the groups of plates co-acting with the wedging means; co-acting means on one of said shells and one of said sets of plates for returning said set of plates to normal position; and co-acting means on the other shell and set of plates for returning the last named set of plates to normal position.

8. In a friction shock absorbing mechanism, the combination with front and rear followers having wedging means associated therewith; of a pair of longitudinally arranged tapering friction elements co-acting with said wedging means; a pair of relatively movable friction shells; a spring resistance interposed between said friction shells; longitudinally arranged sets of intercalated friction plates, said sets of plates being divided into two groups on opposite sides of said shells, with the innermost plate of each group in contact with the friction shells, and the outermost plate of each group co-acting with one of said tapering friction elements; and co-acting means on said shells and tapering friction elements for returning the latter to normal position.

9. In a friction shock absorbing mechanism, the combination with front and rear followers having wedging means associated therewith; of a pair of relatively movable friction shells; a spring resistance interposed between said friction shells; longitudinally arranged alternated friction plates, said plates being divided into two groups on opposite sides of said shells, with the outer plate of each group co-acting with said wedging means; and laterally projecting lugs on each of said shells with the lugs on one of said shells adapted to engage alternate plates to restore the same to normal position and with the lugs on the other shell adapted to engage the remaining plates to restore the same to normal position.

10. In a friction shock absorbing mechanism, the combination with front and rear followers having wedging means associated therewith; of tapering friction elements coacting with said wedging means; a pair of relatively movable friction shells; a spring resistance interposed between said friction shells; longitudinally arranged alternated friction plates, said plates being divided into two groups on the opposite sides of said shells, with the outer plate of each group co-acting with one of said tapering friction elements; and laterally projecting lugs on each of said shells adapted to engage with said tapering elements to restore the same to normal position when the actuating pressure is removed.

11. In a friction shock absorbing mechanism, the combination with front and rear followers having wedging means associated therewith; of a pair of relatively movable friction shells; a spring resistance interposed between said friction shells; longitudinally arranged alternated friction plates, said plates being divided into two groups on opposite sides of said shells; friction elements interposed between said groups of plates and the wedges, each of said elements being longitudinally tapered in opposite directions from the center thereof; and laterally projecting lugs on each of said shells adapted to engage the said tapering friction elements to restore the same to normal position when the actuating pressure is removed.

12. In a friction shock absorbing mechanism, the combination with front and rear follower casings having interior wedge faces on the opposite side walls thereof; of a wedge coacting with each wedge face; oppositely arranged friction plates arranged in two groups, housed within said followers; a pair of friction shells between said groups of plates and provided with exterior friction faces co-operating with the innermost plates of said groups of plates; lugs on said shells with the lugs on one of said shells being adapted to engage with the shoulders on alternate friction plates to restore the same to normal position with the free ends thereof spaced from the end wall of one of said follower casings, and the lugs on the other shell being adapted to engage with the shoulders on the remaining plates to restore the same to normal position with the free ends thereof spaced from the end wall of the other follower casing; a spring resistance interposed between said friction shells; and a friction element interposed between each group of plates and the adjacent side walls of said followers, each of said elements having a flat friction surface, co-acting with the outer friction plate of one of said groups of plates, and a pair of flat faces extending angularly with reference to each other and inclined to the longitudinal axis of the gear, one of said pairs of flat faces being adapted to engage with the wedges co-acting with the adjacent side walls of the front follower casing, and the other face of said pair being adapted to engage with the wedges co-acting with the adjacent side wall of the rear follower casing.

13. In a friction shock absorbing mechanism, the combination with hollow, box-like end members relatively movable toward and from each other; of a longitudinally arranged spring resistance between said members; groups of intercalated, longitudinally extending, relatively movable friction plates at the sides of said spring resistance, said groups of plates being responsive to laterally applied pressure; lateral pressure-resisting means between said groups of plates; and differentially acting wedging means interposed between the walls of said follower members and the respective groups of plates.

14. In a friction shock absorbing mechanism, the combination with hollow and follower members, relatively movable toward and from each other, each of said follower members having opposed interior side walls; of yielding means for resisting relative approach of said members; a plurality of longitudinally disposed, intercalated friction plates, said plates being relatively movable longitudinally of the mechanism and responsive to laterally applied pressure; and differential wedges interposed between each of the opposite side walls of said follower members and the friction plates.

15. A shock absorber comprising two housings movable lengthwise relative to each other, friction shells enclosed within said housings and movable lengthwise of the respective housings, said shells having longitudinally extending friction surfaces, a plurality of groups of friction plates operatively associated with one of the housings and one of the shells, and located on opposite sides of the shells, other friction plates operatively associated with the other housing and shell and intercalated with the first mentioned plates, wedging means engaging the sides of the housings and pressing the plates against the friction surfaces of the shells, and resilient means for actuating the wedging means and returning the parts to normal position after compression.

16. In a draft gear, in combination, a pair of chambered followers, shock absorbing elements interposed between the followers and normally spaced therefrom, said elements comprising a pair of centrally disposed movable friction blocks, shoes having wedging engagement with the side walls of the followers; groups of intercalating friction plates interposed between the friction blocks and shoes, and a main spring resistance interposed between said blocks and yieldingly resisting relative approach of the same.

17. In a draft gear, in combination, a pair of chambered followers, shock absorbing elements interposed between the followers and comprising a pair of centrally disposed friction blocks, shoes having wedging engagement with the side walls of the followers, groups of intercalating friction plates interposed between the friction blocks and the shoes, means for interlocking the shoes associated with each follower with one of the blocks and with one set of plates of each group, and means yieldingly resisting relative movement of said blocks.

18. In a draft gear, in combination, a pair of chambered followers, shock absorbing elements interposed between the followers and comprising a pair of centrally disposed floating friction blocks, shoes having wedging engagement with the side walls of the followers, groups of intercalating friction plates interposed between the friction blocks and the shoes, means actuated by each block and having shouldered engagement with one set of the plates of each group and with one pair of the shoes, and spring means interposed between the said blocks.

19. In a draft gear, in combination, a pair of chambered followers, shock absorbing elements interposed between the followers and comprising a pair of centrally disposed friction members, shoes having wedging engagement with the side walls of the followers, groups of intercalating friction plates interposed between the friction members and shoes, means operatively engaging the shoes associated with each follower with one of the members and with one set of the plates of each group, and spring means interposed between said members.

20. In a friction shock absorbing mechanism, the combination with a set of front and rear, follower-acting members, relatively movable toward and from each other, each of said members having opposed, lateral pressure resisting, longitudinal walls at opposite sides of the mechanism; of a set of front and rear, inner members associated with said follower members, said inner members being separate from said follower members and each also having lateral pressure-resisting, longitudinally disposed walls on opposite sides of the mechanism; a group of intercalated, relatively movable friction plates at each side of the mechanism, said group at one side bearing on the longitudinal walls of one of said sets of members at the corresponding side of the mechanism; wedge means engaging said group of plates and cooperating with the corresponding longitudinal walls of the other set of members; and means yieldingly resisting relative movement of the members of said sets.

In witness that I claim the foregoing I have hereunto subscribed my name this 3rd day of February, 1923.

JOHN F. O'CONNOR.